Jan. 9, 1934.    M. G. BEARD    1,943,233
HEATING AND VENTILATING SYSTEM
Filed Aug. 28, 1931
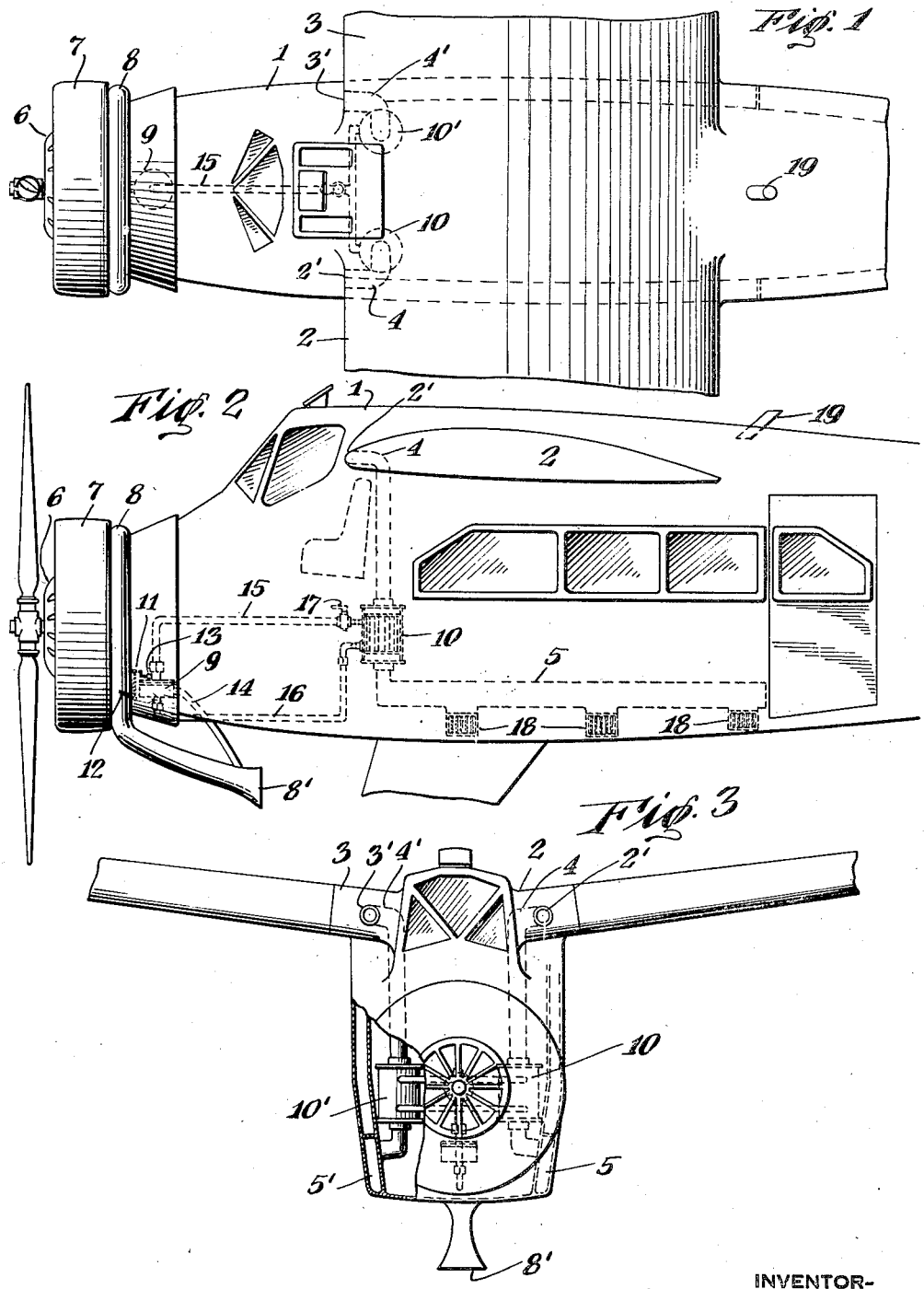
INVENTOR-
Myron G. Beard
BY
Hogust & Meary
ATTORNEYS Patented Jan. 9, 1934

1,943,233

UNITED STATES PATENT OFFICE 1,943,233

HEATING AND VENTILATING SYSTEM

Myron G. Beard, Farmingdale, N. Y., assignor to The Aviation Patent and Research Corporation, New York, N. Y., a corporation of New York Application August 28, 1931. Serial No. 559,921

3 Claims. (Cl. 244—30)

This invention relates in general to heating and ventilating systems for enclosures and more particularly to such a system especially adapted for aircraft cabins.

An object of the invention is to provide a system whereby fresh air may be continuously injected into the enclosure, circulated and expelled and the temperature of the injected air may be predetermined and regulated.

Another object is to provide means whereby the amount of injected air may be regulated.

A further object is to provide means whereby the injected air may be heated prior to its entrance into the main enclosure and whereby the heating of the air will not affect its purity as it will not cause any introduction of gases into the air stream.

A still further object of the invention is to provide an automatic thermostatically operated means for regulating the exposure of a heat transfer medium to a source of heat and a manually operated means for controlling the circulation of the heat transfer medium for heating the injected air.

With the foregoing and other objects in view, the invention consists in the combination of parts and details of construction hereinafter set forth in the following description and appended claims, certain embodiments thereof being illustrated in the accompanying drawing, in which:

Fig. 1 is a top plan view, partly in section, of a portion of a cabin airplane showing the installation of the heating and ventilating system;

Fig. 2 is a side elevation, partly in section, of the same as shown in Fig. 1;

Fig. 3 is a front elevation, partly in section, of the same as shown in Figs. 1 and 2.

Referring more particularly to the drawing, the fuselage or cabin 1 may be provided with stub wings 2 and 3 which may respectively be provided with apertures 2' and 3' at their leading edges with pipes 4 and 4' extending therefrom slightly rearwardly and down the side walls of the cabin into enlarged passageways 5 and 5' also in the sidewalls of the cabin. These stub wings may be in the form of mere metal fairings reaching out to the butt of the wing proper. The important feature is the location of the air intake openings in the leading edge of the wing out from the fuselage a small predetermined distance in such a manner that the air intake will come into the compression area and still be within the slip stream of the propeller which is considerably faster than the speed of the aircraft. This provides for a maximum flow of air through the system and also gets the air intake away from the heated air flowing back from around the engine as this heated air flows close to the skin of the aircraft.

As more clearly shown in Fig. 2, the engine is represented at 6 and may be of the usual internal combustion type and is shown with a cowling 7 and a ring exhaust pipe 8 with the usual outlet 8'. Adjacent to the exhaust pipe is a cylindrical container 9 which is centrally apertured to receive a short pipe 11 communicating with the exhaust pipe. Entrance of the exhaust gases into the container 9 is controlled by a by-pass valve 12 which is controlled by a suitable thermostat 13. The valve 12 as shown, may be of lesser dimension than the exhaust pipe and never by-passes more than half of the gas stream, the remainder being free to pass out the outlet 8' in order not to build up any back pressure in the engine. The gases are led off through the pipe 14 which joins the main exhaust pipe near its outlet end. Although the valve shown is of the preferred relative dimensions to the exhaust pipe, it is quite feasible to make it of such dimensions that it will divert all of the exhaust gases through the container should it be found desirable for heating purposes.

The container 9 contains a fluid of high boiling point and low freezing point, such as "prestone" which is out of contact with the exhaust gases but adapted to be heated thereby. Pipes 15 and 16 provide means for circulation of the prestone to a container 10 similar in nature to 9, the former encircling the air inlet pipe 4. The prestone heated by the exhaust gases thus acts, by its circulation only between the containers 9 and 10, to heat the incoming air stream in the pipe 4 and the prestone never enters the air stream. While container 10 is shown as encircling the air duct it may equally well be interposed in the air duct, or may be in the form of a honeycombed radiator interposed in the duct with the air passages passing directly through small radiator tubes.

The system is so arranged as to provide container 10 with a gravity circulating system, it being arranged in a considerably elevated plane in comparison to container 9 with which it communicates. Thus the fluid is heated in container 9 and flows up in container 10 where it is cooled and returned to container 9.

Suitably valved air registers 18 are provided for regulating the intake of air into the cabin while a Venturi outlet 19 is provided for ejecting the air to provide for free circulation of fresh air. In order to regulate the heat of the air there is provided a manual control in the form of a valve 17 which when closed prevents circulation and when open allows circulation of the prestone between the two containers. When the valve 17 is closed circulation, being discontinued, the heat of the exhaust gases builds up sufficient heat in the prestone in container 9 to cause the thermostat to act to close the valve 12, cutting off the flow of exhaust gas into the container. When heat within the cabin is desired, the valve 17 is opened allowing circulation of the prestone and this circulation will be readily brought about by the lowness of temperature of the injected air in the pipe 4. The thermostat then causes the valve 12 to be swung into the exhaust pipe and by-pass the exhaust gases into the pipe 12 and the container 9 and thus bring about the desired heat transfer.

This system as far as is concerned may be unitary or multiple in nature. In other words, there may be one or more sets of the containers 9 and 10 together with the necessary circulation pipes, or there may be one container 9 and two or more containers 10 and 10' as may be found most desirable.

I claim:

1. A heating and ventilating system for the cabin of an engine propelled aircraft comprising conduits open to the outside atmosphere and extending into the cabin for conveying air there into, valve controlled air registers in the conduits in the cabin and a Venturi outlet for said air from the cabin, means for heating the air while in the conduit prior to the entrance of the air into the cabin, said means comprising a pair of containers of fluid of low freezing and high boiling point with communicating pipes therebetween, one of said containers being arranged adjacent to the air intake conduit and the other adjacent the exhaust pipe of the engine of said aircraft, valve means for controlling the circulation of said fluid, and thermostatically controlled valve means for controlling the direction of flow of the engine exhaust gases so as to control the heating effect thereof on said fluid.

2. A heating and ventilating system for the cabin of an engine propelled aircraft comprising air conveying conduits extending from the leading edges of the wings to the interior of the cabin and a Venturi air outlet therefrom, an exhaust pipe leading from said engine, a pair of containers one of which encircles in non-communicating relation with said air conduit and the other of which has the same relation with a by-pass pipe leading from said exhaust pipe, both of said containers carrying fluid of a low freezing and high boiling point and communicating pipes therebetween, said by-pass pipe being provided with a valve controlled by a thermostat carried by the container which is in thermally conductive relationship with said by-pass pipe from the exhaust pipe, said fluid circulating pipes being provided with a manually operated valve.

3. A heating and ventilating system for the cabin of an engine propelled aircraft comprising air conveying conduits extending from the leading edges of the wings to the interior of the cabin, an exhaust pipe leading from said engine, a pair of containers one of which encircles in non-communicating relation with said air conduit and the other of which has the same relation with a by-pass pipe leading from said exhaust pipe, both of said containers carrying fluid of a low freezing and high boiling point and communicating pipes therebetween, said by-pass pipe being provided with a valve controlled by a thermostat carried by the container which is in thermally conductive relationship with said by-pass pipe from the exhaust pipe, said fluid circulating pipes being provided with a manually operated valve.

MYRON G. BEARD.